United States Patent
Thayer et al.

(10) Patent No.: US 7,296,084 B2
(45) Date of Patent: Nov. 13, 2007

(54) DATA MANAGEMENT SYSTEM AND METHOD

(75) Inventors: Jennifer J. Thayer, Greeley, CO (US); Jeffrey D. Schwartz, Loveland, CO (US); Neal A. Krawetz, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1155 days.

(21) Appl. No.: 10/167,359

(22) Filed: Jun. 11, 2002

(65) Prior Publication Data

US 2003/0229712 A1  Dec. 11, 2003

(51) Int. Cl.
  *G06F 15/16* (2006.01)
  *G06F 9/44* (2006.01)
(52) U.S. Cl. ...................... 709/236; 717/171
(58) Field of Classification Search ................ 709/208, 709/236; 340/825.5; 370/236–386, 394; 713/153; 717/168, 171
  See application file for complete search history.

(56) References Cited

U.S. PATENT DOCUMENTS

| 4,654,654 | A | * | 3/1987 | Butler et al. ............. 340/825.5 |
| 5,222,061 | A | * | 6/1993 | Doshi et al. ................ 370/394 |
| 5,455,865 | A | * | 10/1995 | Perlman ..................... 713/153 |
| 6,269,080 | B1 | * | 7/2001 | Kumar ....................... 370/236 |
| 2003/0002494 | A1 | * | 1/2003 | Kuukankorpi et al. ...... 370/386 |
| 2003/0093485 | A1 | * | 5/2003 | Dougall et al. ............ 709/208 |

OTHER PUBLICATIONS

Lee et al., Yield analysis and data management using Yield Manager, Advanced Semiconductor Manufacturing Conference and Workshop, 1998, 1998 IEEE Sep. 23-25, 1998,pp. 19-30.*

* cited by examiner

*Primary Examiner*—Andrew Caldwell
*Assistant Examiner*—Douglas Blair

(57) ABSTRACT

A data management system comprises a processor adapted to receive a transfer of an update. The system also comprises an update manager accessible by the processor and adapted to obtain a listing identifying each of a plurality of data packets corresponding to the update. The update manager is further adapted to access the listing to determine a transfer status of each of the data packets in response to a partial transfer of the update.

44 Claims, 3 Drawing Sheets

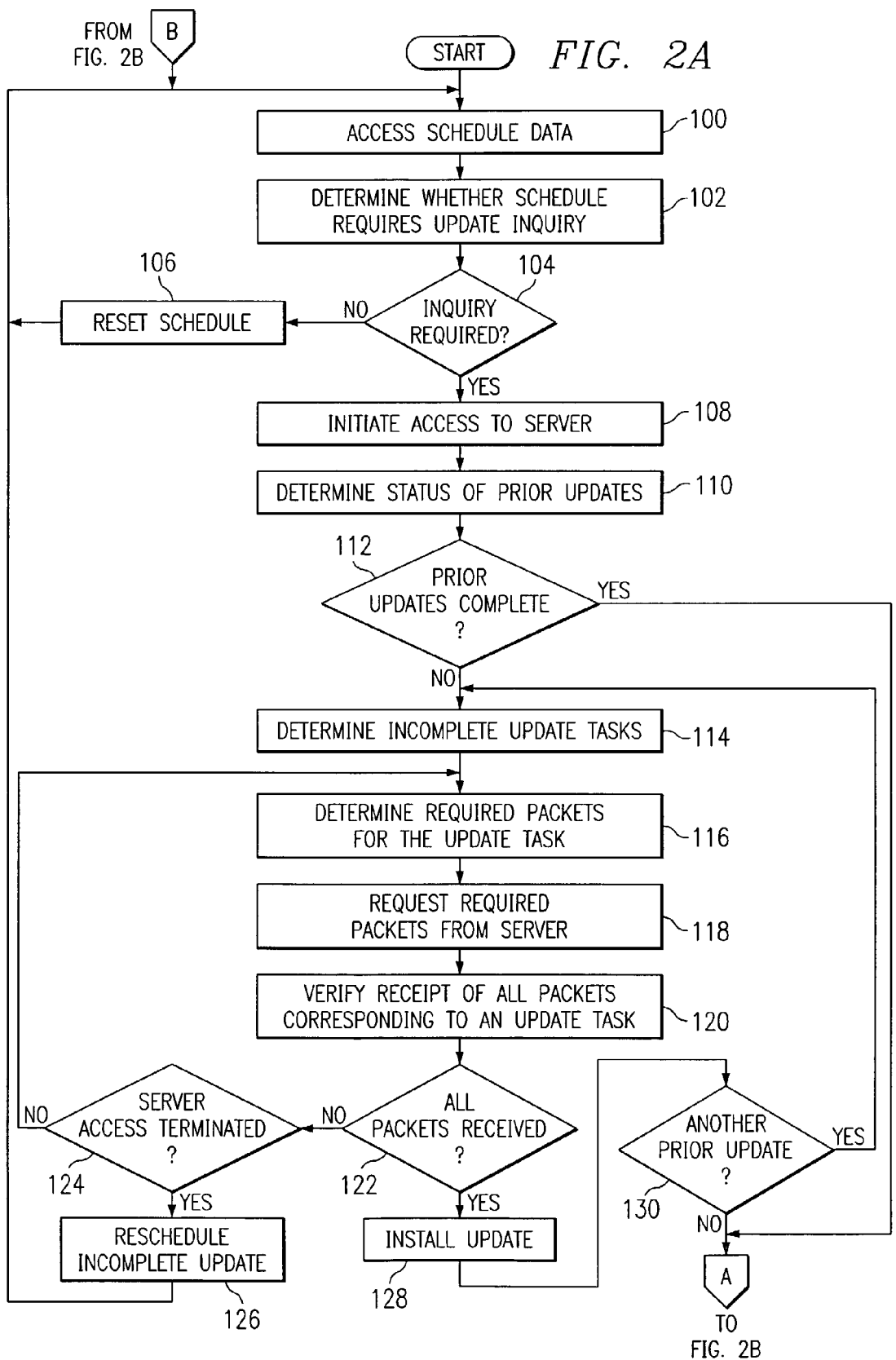

DATA MANAGEMENT SYSTEM AND METHOD

TECHNICAL FIELD OF THE INVENTION

The present invention relates generally to the field of data communications and, more particularly, to a data management system and method.

BACKGROUND OF THE INVENTION

Information transfer via the Internet, intranet, and other wired or wireless communication mediums is widely known and used. However, connection speed often limits the amount of information that may be successfully transferred over such communication mediums. For example, at relatively slow connection speeds, such as dial-up and other types of slow connections, the connection may be lost before information transfer is complete. Thus, connections may have to be repeatedly reestablished. In the case of large file downloads, repeated download attempts may be necessary before the entire file successfully transfers, at which time the file may then be loaded or installed.

SUMMARY OF THE INVENTION

In accordance with one embodiment of the present invention, a data management system comprises a processor adapted to receive a transfer of an update. The system also comprises an update manager accessible by the processor and adapted to obtain a listing identifying each of a plurality of data packets corresponding to the update. The update manager is further adapted to access the listing to determine a transfer status of each of the data packets in response to a partial transfer of the update.

In accordance with another embodiment of the present invention, a data management method comprises identifying an update to be received and obtaining a listing identifying each of a plurality of data packets corresponding to the update. The method also comprises determining a transfer status of each of the data packets in response to a partial transfer of the update.

BRIEF DESCRIPTION OF THE DRAWINGS

For a more complete understanding of the present invention and the advantages thereof, reference is now made to the following descriptions taken in connection with the accompanying drawings in which:

FIGS. 2A and 2B are a flow chart illustrating a method for data management in accordance with an embodiment of the present invention.

DETAILED DESCRIPTION OF THE DRAWINGS

Figure 1:
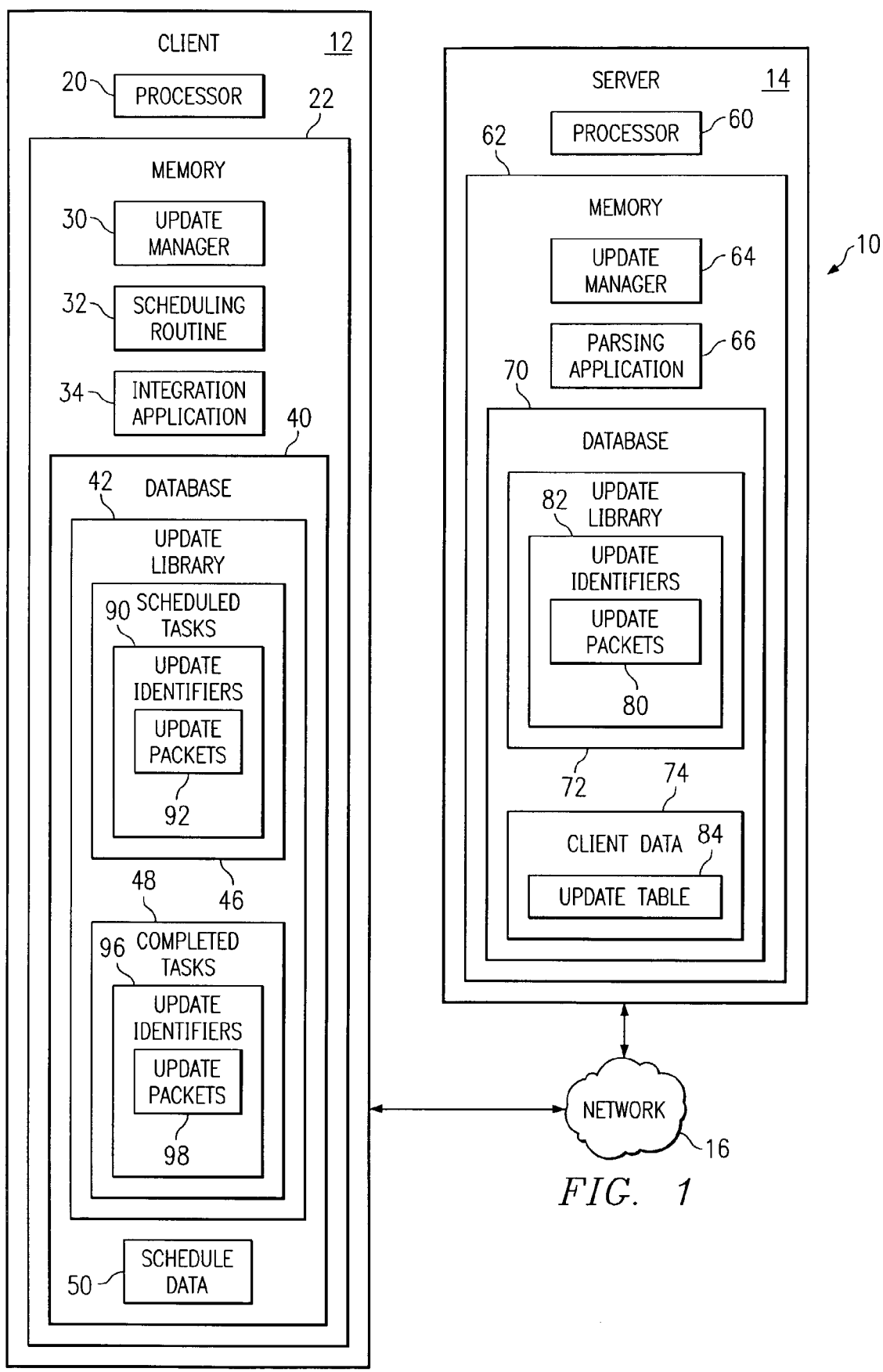
FIG. 1 is a block diagram illustrating an embodiment of a data management system in accordance with the present invention.

The preferred embodiments of the present invention and the advantages thereof are best understood by referring to FIGS. 1 and 2 of the drawings, like numerals being used for like and corresponding parts of the various drawings.

FIG. 1 is a block diagram illustrating an embodiment of a data management system 10 in accordance with the present invention. In the illustrated embodiment, data is transmitted between a client 12 and a server 14 via a communication network 16. Client 12 may comprise a desktop computer, personal digital assistant, or other computer or processing device for communicating with server 14 via communication network 16. Client 12 may also comprise another server communicating with server 14 via communication network 16. Communication network 16 may comprise the Internet, a local area network, a wide area network, or other type of wired or wireless communication medium for transmitting information between client 12 and server 14.

In the illustrated embodiment, client 12 comprises a processor 20 coupled to a memory 22. The present invention also encompasses computer software that may be stored in memory 22 and executed by processor 20. In this embodiment, client 12 comprises an update manager 30, a scheduling routine 32, and an integration application 34, which are computer software programs. However, it should be understood that the present invention may be configured having software, hardware, or a combination of software and hardware components. In FIG. 1, update manager 30, scheduling routine 32, and integration application 34 are illustrated as being stored in memory 22, where they can be executed by processor 20. However, it should be understood that update manager 30, scheduling routine 32, and integration application 34 may be otherwise stored such that update manager 30, scheduling routine 32, and integration application 34 are accessible by processor 20.

Briefly, update manager 30 manages information transfer between client 12 and server 14. For example, update manager 30 monitors the status of information contained at client 12 to determine whether information transfer should be initiated between server 14 and client 12, initiates communications with server 14 to obtain desired information, and/or determine the status or completeness of information transfer between client 12 and server 14. Scheduling routine 32 controls scheduling of information transfer between client 12 and server 14. Integration application 34 controls the integration or assembling/reassembling of various portions or pieces of information transmitted between client 12 and server 14 to form a complete communication.

In the illustrated embodiment, client 12 also comprises a database 40. In this embodiment, database 40 has an update library 42 comprising information associated with data transfer between client 12 and server 14. For example, in the illustrated embodiment, update library 42 comprises scheduled tasks 46 and completed tasks 48. Briefly, scheduled tasks 46 comprises information associated with scheduled transfers of information between client 12 and server 14. Completed tasks 48 comprises information associated with successfully transferred information between client 12 and server 14. In FIG. 1, database 40 also has scheduled data 50 comprising information associated with the scheduling of information transfer between client 12 and server 14.

In the illustrated embodiment, server 14 comprises a processor 60 coupled to a memory 62. The present invention also encompasses computer software that may be stored in memory 62 and executed by processor 60. In this embodiment, server 14 comprises an update manager 64 and a parsing application 66, which are computer software programs. In FIG. 1, update manager 64 and parsing application 66 are illustrated as being stored in memory 62, where they can be executed by processor 60. Briefly, update manager 64 controls and monitors information transfer between client 12 and server 14. Parsing application 66 parses or divides an update into a plurality of discrete portions.

In the illustrated embodiment, server 14 also comprises a database 70. In this embodiment, database 70 has an update library 72 comprising information associated with data required to be transferred from server 14 to client 12. In this embodiment, database 70 also has client data 74 comprising information associated with a status of information transfer from server 14 to client 12. As illustrated in FIG. 1, this embodiment of update library 72 comprises one or more updates 76. As used herein, the term "update" may comprise any form of data, such as, but not limited to, an executable program, a data file, an upgrade to an existing file or program, or an instruction to delete or replace a data file or other data component.

In operation, parsing application 66 parses or divides each update 76 to be transferred from server 14 to client 12 into a designated or predetermined quantity of data packets 80 and stores data packets 80 in update library 72. For example, parsing application 66 may parse each update 76 such that each data packet 80 comprises less than a predetermined amount of data. Update manager 64 may assign an update identifier 82 corresponding to each update 76 to be transmitted to client 12. In the illustrated embodiment, update 76 is stored to server 14 and then parsed by parsing application 66; however, it should be understood that update 76 may be parsed before storage to the server such that only data packets 80 are uploaded to server 14, thereby enabling parsing application 66 to reside elsewhere than on server 14.

In this embodiment, client data 74 comprises an update table 84 having information associated with update 76 transfer to each client 12. For example, update table 84 may comprise a relational database associating each update 76 transmitted to a particular client 12 such that update manager 64 may access update table 84 to determine which updates 76 are required for each client 12. Alternatively, update manager 64 may maintain a listing of updates 76 retained in update library 72 such that update manager 30 of client 12 may determine which updates 76 require downloading from server 14.

In operation, scheduling routine 32 generates scheduled data 50 corresponding to periodic connections to server 14 via communication network 16 to determine whether updates 76 residing on server 14 require downloading to client 12. Schedule data 50 may also comprise information associated with resuming previously scheduled or partial update 76 downloads. For example, at a particular time corresponding to schedule data 50, update manager 30 may initiate a connection to server 14 via communication network 16. Update manager 30 may poll server 14 to determine whether updates 76 reside in update library 72 for downloading to client 12. As described above, client data 74 may also comprise update table 84 which may identify particular updates 76 required for downloading from server 14 to client 12. If a particular update 76 requires downloading from server 14 to client 12, scheduling routine 32 may automatically initiate the download of the designated update 76 or may schedule the download of the designated update 76 for another time. Server 14 may also periodically initiate a connection to client 12 to identify updates 76 requiring downloading to client 12. In this example, schedule data 50 may comprise information associated with retrieval of updates 76 at later times.

As described above, scheduled tasks 46 may comprise information associated with updates 76 to be downloaded from server 14. Update manager 30 may retrieve or receive a particular identifier 82 from server 14 corresponding to a particular update 76 and store the identifier 82 as an update identifier 90 in scheduled tasks 46. Additionally, update manager 30 obtains a listing of data packets 80 corresponding to a particular update identifier 82 and stores the listing of data packets 80 as data packets 92 within scheduled tasks 46. Thus, update manager 30 determines a listing of the data packets 92 forming the complete update 76. Accordingly, after receipt of all data packets 92 corresponding to a particular update 76, the update 76 may then be installed at client 12.

As each update packet 92 corresponding to a particular update 76 is received or retrieved by client 12, update manager 30 stores the update identifier 96 and corresponding update packet 98 within completed tasks 48. Accordingly, update manager 30 may compare completed tasks 48 with scheduled tasks 46 to determine whether a particular update 76 was partially or completely transferred from server 14 to client 12. For example, update manager 30 may compare data packets 98 with data packets 92 to determine whether client 12 has received all data packets corresponding to a particular update 76 or whether update 76 has been partially received. Partial receipt of update 76 may be due to an inadvertent disconnection from server 14, one or more data packets 80 being corrupted, infected, or otherwise unusable or undesirable, or perhaps only a portion of update 76 was scheduled for download from server 14. For example, if the connection to server 14 is disconnected or otherwise terminated, update manager 30 may compare data packets 92 and 98 to determine which data packets 92 failed to be downloaded from server 14. If a communication network 16 disconnection occurs, scheduling routine 32 may automatically reschedule another connection to server 14 to download the remaining data packets 92.

Thus, by parsing update 76 into data packets 80, successfully-transferred data packets 80 may be stored at client 12 until all data packets 80 corresponding to a particular update 76 are received at client 12. If one or more data packets 80 are not received, client 12 requests or retrieves the remaining data packets 80 from server 14 until all of data packets 80 corresponding to the particular update 76 are retrieved, thereby eliminating the requirement of repeatedly attempting to download the entire update 76 if even a small portion of the download was previously unsuccessful or incomplete, especially when dial-up or other relatively slower types of connections via communication network 16 are used.

Figure 2B:
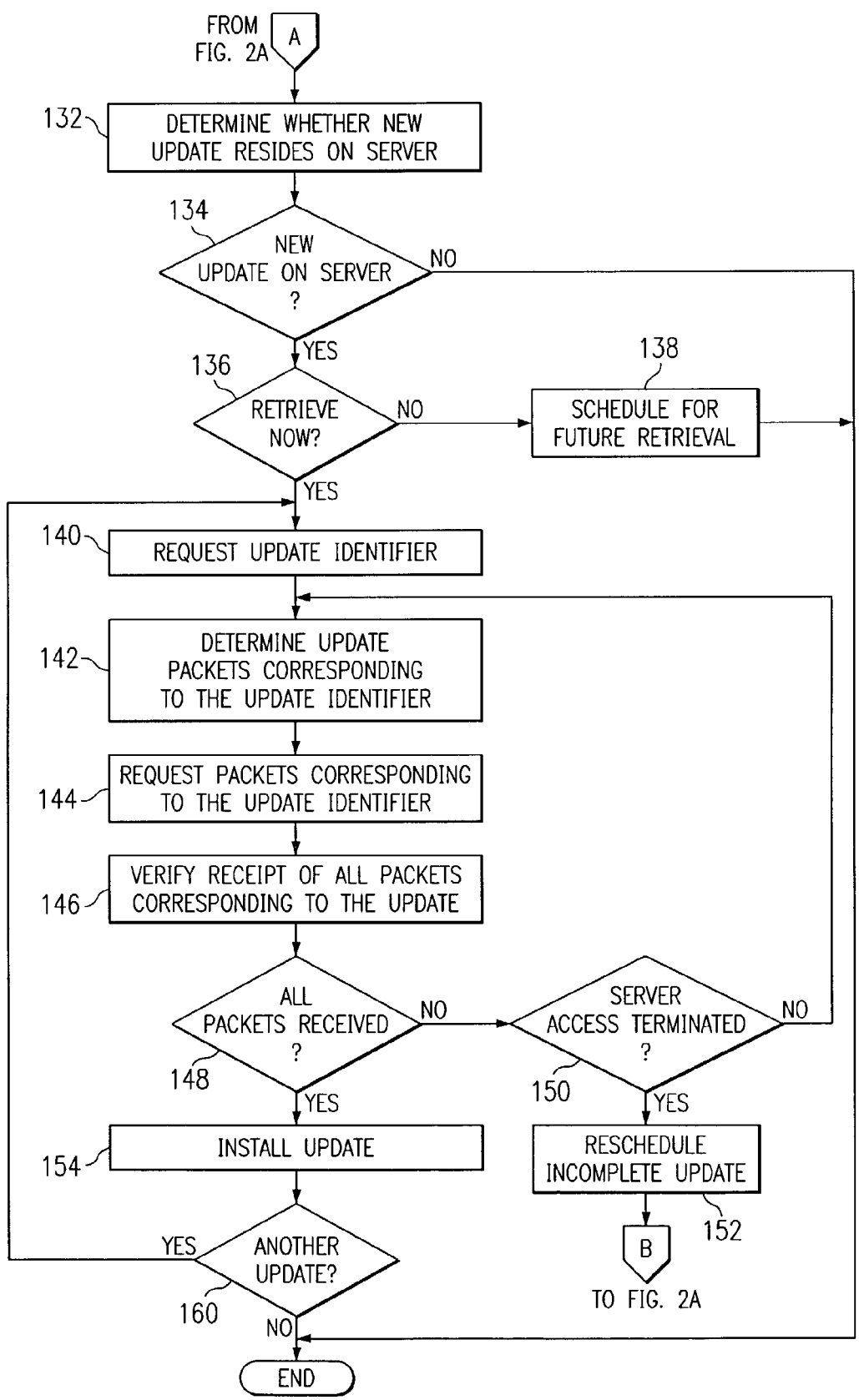

FIGS. 2A and 2B are a flowchart illustrating a method for data management in accordance with embodiment of the present invention. The method begins at step 100, where update manager 30 accesses schedule data 50. At step 102, update manager 30 determines whether schedule data 50 requires a connection to server 14 to inquire about possible updates 76 to client 12. At decisional step 104, if an update 76 inquiry is not required according to schedule data 50, the method proceeds to step 106, where scheduling routine 32 may reset a clock associated with schedule data 50. If an update 76 inquiry is required according to schedule data 50, the method proceeds from step 104 to step 108, where update manager 30 initiates contact with server 14 via communication network 16.

At step 110, update manager 30 determines a status of prior update 76 downloads from server 14. For example, as described above, update manager 30 may compare scheduled tasks 46 with completed tasks 48 to determine whether additional data packets 92 corresponding to a particular update 76 require downloading from server 14 before client 12 may install the particular update 76. At decisional step 112, if transfer of prior updates 76 is complete, the method proceeds from step 112 to step 132. If transfer of prior updates 76 is incomplete, the method proceeds from step 112 to step 114, where update manager 30 accesses scheduled tasks 46 to determine and identify the incomplete scheduled tasks 46. At step 116, update manager 30 identifies the data packets 92 corresponding to a partially transferred update 76. At step 118, update manager 30 requests transmittal of the identified data packets 92.

At step 120, update manager 30 verifies receipt of all data packets 92 corresponding to a particular update identifier 90. At decisional step 122, if all data packets 92 corresponding to a particular update 76 have not been received, the method proceeds to decisional step 124, where update manager 30 determines whether a connection to server 14 has been terminated. If a connection to server 14 has been terminated, the method proceeds from step 124 to step 126, where scheduling routine 32 may automatically reschedule retrieval of the partially transferred update 76. If the connection to server 14 has not been terminated, the method returns to step 116. If all data packets 92 corresponding to a particular update 76 have been received at decisional step 122, the method proceeds to step 128, where update manager 30 may install and load the particular update 76 to client 12.

At decisional step 130, update manager 30 determines whether another scheduled task 46 requires completion. If another scheduled task 46 requires completion, the method returns to step 114. If another scheduled task 46 does not require completion, the method proceeds from step 130 to step 132, where update manager 30 determines whether a new update 76 resides on server 14. As described above, update manager 64 may access client data 74 to determine whether the particular client 12 requires an additional update 76. Update manager 64 may also access update library 72 and provide client 12 with a listing of current updates 76 residing on server 14 such that update manager 30 may compare the listing of updates 76 residing on server 14 with completed tasks 48 to determine whether a particular update 76 requires downloading from server 14.

At decisional step 134, if no new updates 76 reside on server 14, the method ends. If a new update 76 resides on server 14, the method proceeds from step 134 to decisional step 136, where update manager 30 determines whether client 12 should retrieve the new update 76 at the present time. If client 12 will not retrieve the new update 76 at the present time, the method proceeds from step 136 to step 138, where scheduling routine 32 updates schedule data 50 corresponding to a future retrieval time for the new update 76. If client 12 will retrieve the new update 76 at the present time, the method proceeds from step 136 to step 140, where update manager 30 requests from server 14 an update identifier 82 corresponding to the new update 76. As described above, update manager 64 provides client 12 with the update identifier 82 and update manager 30 stores the update identifier 82 as an update identifier 90 within scheduled tasks 46.

At step 142, update manager 30 request a listing of the data packets 80 corresponding to the particular update 76 and stores the listing of data packets 80 as data packets 92 within scheduled tasks 46. At step 144, update manager 30 requests transmittal of the data packets 92 corresponding to the new update 76 from server 14. In this example, update manager 30 initiates communications with server 14 and requests the desired information. However, it should be understood that server 14 may also initiate communications with client 12 and automatically forward various types of the described information.

At step 146, update manager 30 verifies receipt of all data packets 92 corresponding to the particular update 76. At decisional step 148, if all data packets 92 have not been received corresponding to a particular update 76, the method proceeds to decisional step 150, where update manager 30 determines whether the connection to server 14 has been terminated. If the connection to server 14 has not been terminated, the method returns to step 142. If the connection to server 14 has been terminated, the method proceeds from step 150 to step 152, where scheduling routine 32 updates schedule data 50 to reflect a future time for retrieval of the partially transmitted update 76. The method then proceeds from step 152 to step 100. If all data packets 92 corresponding to a particular update 76 have been received at decisional step 148, the method then proceeds to step 154, where update manager 30 may load and install the particular update 76 on client 12. At decisional step 160, update manager 30 determines whether another update 76 resides on server 14 requiring download to client 12. If another update 76 requires downloading from server 14, the method returns to step 140. If no additional updates 76 reside on server 14 requiring downloading to client 12, the method ends and the connection to server 14 may be terminated.

What is claimed is:

1. A data management system, comprising:
   a processor adapted to receive a transfer of an update; and
   an update manager accessible by the processor and adapted to obtain a listing identifying each of a plurality of data packets corresponding to the update prior to a transfer of the update.

2. The system of claim 1, further comprising a scheduling routine accessible by the processor and adapted to schedule a time to transfer the update.

3. The system of claim 1, further comprising a scheduling routine accessible by the processor and adapted to automatically schedule a transfer of a data packet corresponding to a corrupted data packet.

4. The system of claim 1, wherein the update manager is adapted to identify at least one of the plurality of packets of the update remaining for transfer in response to an interrupted transfer of the update.

5. The system of claim 1, further comprising a scheduling routine accessible by the processor and adapted to automatically schedule a transfer of at least one of the data packets that are part of an interrupted transfer of the update.

6. The system of claim 1, wherein the update manager is adapted to obtain an identifier associated with the update.

7. The system of claim 1, further comprising an integration application accessible by the processor and adapted to assemble the data packets to form the update.

8. The system of claim 1, wherein the update manager is adapted to retrieve from a server the listing of data packets associated with the update.

9. The system of claim 1, further comprising a scheduling routine accessible by the processor and adapted to automatically schedule a reconnection to a server in response to a partial transfer of the update.

10. The system of claim 1, wherein the update manager is adapted to automatically poll a server to determine whether the update requires retrieval.

11. The system of claim 1, wherein the update manager is adapted to identify receipt of at least one corrupted data packet corresponding to the update.

12. A data management method, comprising:
    identifying an update to be received; and
    obtaining a listing identifying each of a plurality of data packets corresponding to the update prior to a transfer of the update.

13. The method of claim 12, further comprising assembling the data packets to form the update.

14. The method of claim 12, further comprising automatically scheduling a transfer of at least one of the data packets that are part of a partial transfer of the update.

15. The method of claim 12, further comprising determining whether at least one of the data packets comprises a corrupted data packet.

16. The method of claim 12, further comprising polling a server for the update.

17. The method of claim 12, further comprising automatically scheduling a time to poll a server for the update.

18. The method of claim 12, further comprising automatically detecting a disconnection to a server.

19. The method of claim 12, further comprising automatically scheduling a time period for connecting to a the server to receive the update in response to a disconnection from the server.

20. The method of claim 12, further comprising automatically determining a retrieval status of a prior update.

21. The method of claim 20, further comprising automatically requesting from a server transfer of data packets corresponding to the prior update.

22. A data management system, comprising:
means for receiving an update; and
means for obtaining a listing identifying each of a plurality of data packets forming the update prior to a transfer of the update.

23. The system of claim 22, further comprising means for automatically scheduling transfer of the data packets.

24. The system of claim 22, further comprising means for retrieving an identifier associated with the update.

25. The system of claim 22, further comprising means for automatically scheduling a connection to a server in response to a disconnection from the server.

26. The system of claim 22, further comprising means for polling a server to determine whether an update requires transfer.

27. The system of claim 22, further comprising means for automatically scheduling transfer of at least one of the data packets that are part of the partial transfer.

28. The system of claim 22, further comprising means for determining a transfer status of a prior update.

29. The system of claim 22, further comprising means for assembling the data packets to form the update.

30. A data management system, comprising:
a processor;
an update manager accessible by the processor and adapted to periodically poll a server regarding an update, the update comprising a plurality of data packets, the update manager adapted to obtain a listing of the plurality of data packets forming the update prior to a transfer of the update; and
a scheduling routine accessible by the processor and adapted to automatically schedule transfer of at least one of the data packets in response to a partial transfer of the update.

31. The system of claim 30, further comprising an integration application accessible by the processor and adapted to assemble the data packets to form the update.

32. The system of claim 30, wherein the update manager is further adapted to determine a status of a prior update.

33. The system of claim 30, wherein the update manager is further adapted to detect a disconnection from the server.

34. The system of claim 30, wherein the scheduling routine is adapted to automatically schedule a reconnection to the server in response to a disconnection from the server.

35. The system of claim 30, wherein the scheduling routine is adapted to automatically schedule transfer of at least one of the data packets in response to receipt of a corrupted data packet.

36. The system of claim 30, wherein the update manager is adapted to retrieve an identifier associated with the update.

37. The system of claim 30, further comprising an update library accessible by the processor and having information associated with received data packets corresponding to the update.

38. The system of claim 30, wherein the update manager is adapted to request from the server at least one data packet corresponding to the partially transferred update.

39. A data management system, comprising:
a processor adapted to receive a transfer of an update, the processor adapted to obtain a listing identifying each of a plurality of data packets forming the update prior to a transfer of the update.

40. The system of claim 39, wherein the processor is adapted to schedule a time to transfer the update.

41. The system of claim 39, wherein the processor is adapted to identify at least one of the plurality of packets of the update remaining for transfer in response to an interrupted transfer of the update.

42. The system of claim 39, wherein the processor is adapted to automatically schedule a transfer of at least one of the data packets that are part of an interrupted transfer of the update.

43. The system of claim 39, wherein the processor is adapted to obtain an identifier associated with the update.

44. The system of claim 39, wherein the processor is adapted to automatically poll a server to determine whether the update requires retrieval.

* * * * *

UNITED STATES PATENT AND TRADEMARK OFFICE
CERTIFICATE OF CORRECTION

PATENT NO. : 7,296,084 B2  
APPLICATION NO. : 10/167359  
DATED : November 13, 2007  
INVENTOR(S) : Jennifer J. Thayer et al.

Page 1 of 1

It is certified that error appears in the above-identified patent and that said Letters Patent is hereby corrected as shown below:

In column 7, line 11, in Claim 19, delete "the" before "server".

Signed and Sealed this

Seventeenth Day of June, 2008

JON W. DUDAS  
*Director of the United States Patent and Trademark Office*